United States Patent
Jorn

[11] 3,843,272
[45] Oct. 22, 1974

[54] BALL JOINT
[76] Inventor: Raoul Jorn, Post Wasserburg A.B., D-8992 Hengnau, Germany
[22] Filed: Jan. 3, 1973
[21] Appl. No.: 320,701

[30] Foreign Application Priority Data
Jan. 5, 1972 Austria ................................ 56/72

[52] U.S. Cl. .............................................. 403/132
[51] Int. Cl. ............................................ F16c 11/06
[58] Field of Search ........... 403/122, 124, 125, 126, 403/127, 129, 130, 131, 132, 133, 135; 29/149.5 B

[56] References Cited
UNITED STATES PATENTS
| | | | |
|---|---|---|---|
| 2,855,232 | 10/1958 | Kozak | 403/132 |
| 2,970,853 | 2/1961 | Baker | 403/125 |
| 3,094,376 | 6/1963 | Thomas | 29/149.5 B |

FOREIGN PATENTS OR APPLICATIONS
| | | | |
|---|---|---|---|
| 229,080 | 7/1960 | Australia | 29/149.5 B |
| 604,383 | 7/1948 | Great Britain | 403/132 |
| 848,899 | 9/1960 | Great Britain | 403/132 |
| 1,150,912 | 5/1969 | Great Britain | 403/130 |

*Primary Examiner*—Werner H. Schroeder
*Attorney, Agent, or Firm*—Karl F. Ross; Herbert Dubno

[57] ABSTRACT

A ball joint comprises a generally spheroidal ball member to which at least an annular strip of a resiliently compressible elastomeric material is vulcanized. A metal shell in the form of an annular sheet metal body surrounds an axis of the ball and is vulcanized to the elastomer layer over a part of its exposed surface. A housing receives the elastomer layer and ball under compression whereby the shell prevents extrusion of the elastomer material as compression is applied or the ball joint is used.

18 Claims, 15 Drawing Figures

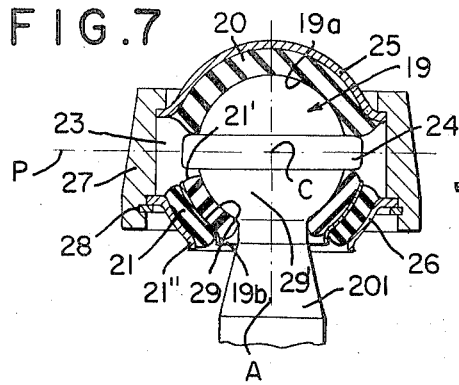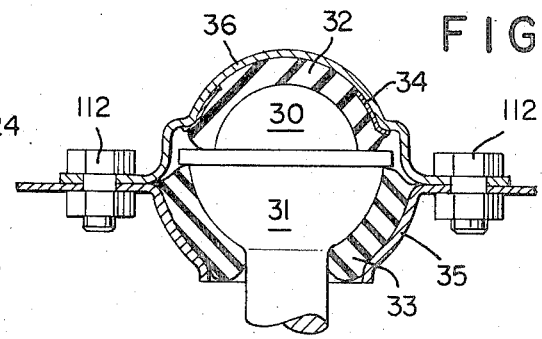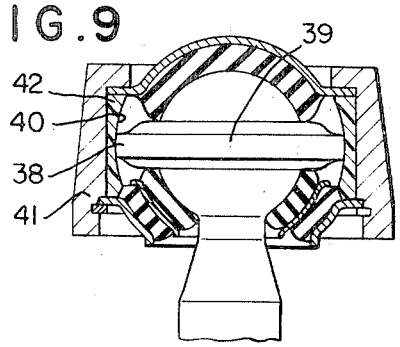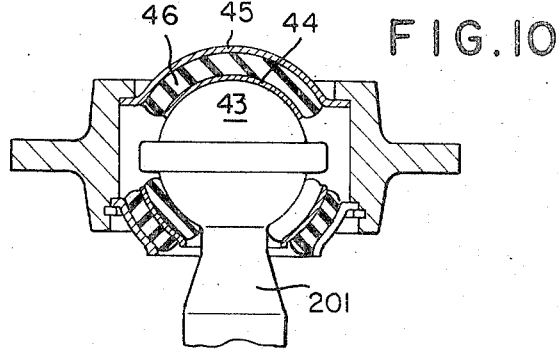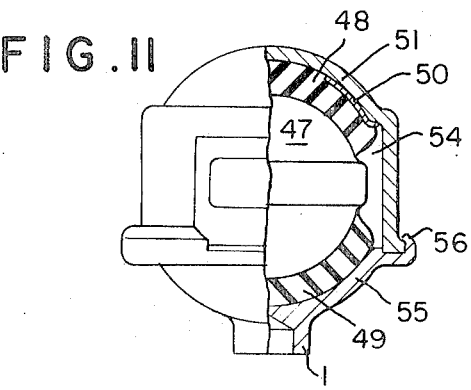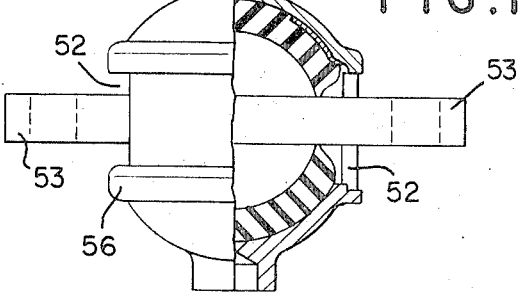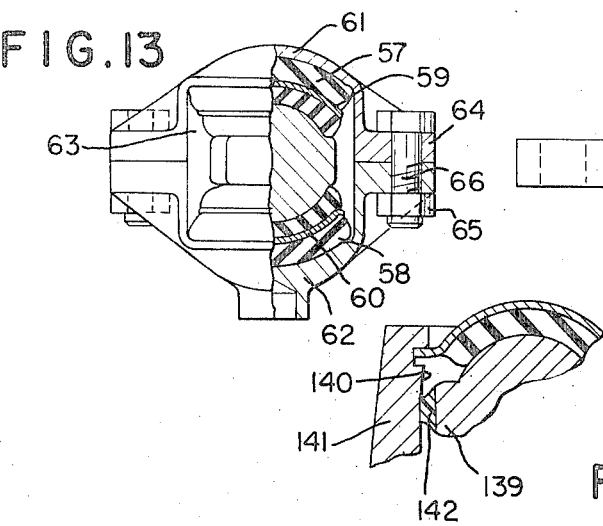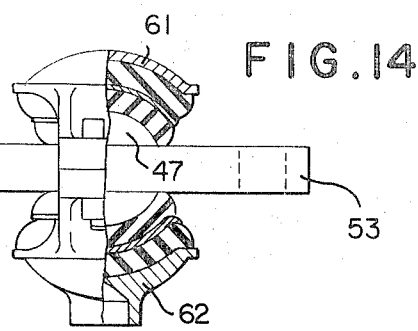

ly pivotal movement are thus known, in which the
BALL JOINT

FIELD OF THE INVENTION

The present invention relates to a ball joint in which a generally spheroidal or ball-shaped member is received in a housing with at least limited mobility and an elastomeric body or layer is interposed between the ball and the housing. More particularly, the invention relates to ball joints of a type particularly useful for attaching an end of a shock absorber structure or leg to a vehicle body or axle.

BACKGROUND OF THE INVENTION

It is a common practice to provide ball joints or the like between one end of the elongated shock damper or the shock absorber (shock-absorber leg) of an automotive vehicle and the vehicle body or a wheel axle assembly so that at least limited relative movement between the shock absorber and the supporting structure can be permitted. Such movement generally requires at least two angular degress of freedom. For this purpose, the spheroidal body may be received in a housing for pivoting movement about the center of the ball in any direction.

In conventional ball joints of this type, the housing is a socket into which the ball is fitted, with a stud, pin or mounting bolt of the ball member projecting therefrom. To limit the displacement of the ball member, to cushion the transfer of force between the ball member and the housing and to prevent the devepolment of play in the ball joint, it is not an uncommon practice to provide a layer of elastomeric material under compression between the ball and the housing.

Maintenance-free ball joints with substantially universally pivotal movement are thus known, in which the mobility of the ball member relative to the housing is permitted only with molecular deformation of the elastomeric (rubber) layer and freedom of friction therein. In this case, the ball-shaped elastomeric layer is clamped between a metallic ball and a metallic outer housing under high compression so that the friction force between the ball surface and the elastomer layer and between the elastomer housing are greater than the force required for molecular deformation. To provide the compression, the outer housing may be provided with bolts which extend radially with respect to the ball structure and which transfer force from the joint to the supporting structure. The ball may be provided with the aforementioned mounting bolt, pin or stud, or with a pair of laterally extending fastening arms which lie in a radial plane of the ball. An annular gap is provided between the inner ball and the outer housing to permit the shifting action about the center of the ball.

In practice, it has been found that such ball joints are only suitable when the lateral annular gap between the inner and outer members of the joint are relatively small since otherwise the movement will cause the elastic material to extrude into the gap under radial loading. Furthermore, because of the annular gap being relatively small, there is a tendency for the elastomeric material in the region of the gap to be deformed or damaged. Also, with the ball joints described above, only small swivel movements up to, say, 7°, can be accommodated.

Another disadvantage of the prior-art systems described above is that they must be substantially symmetrical and thus the rubber may pass on opposite sides into an annular gap on loading. Furthermore, the ball joint can tolerate only smaller forces in the direction of the mounting arms or bolts than may be applied perpendicularly to the axis of the latter. The spring constant in this direction is also relatively small.

To avoid these disadvantages, it has been proposed to provide a maintenance-free rubber-metal ball joint in which a ball-shaped rubber layer is vulcanized to both the outer housing and the inner wall. While these systems allow increased deflection of the two members, they generally are difficult to assemble and costly. The cost of constructing such ball joints is relatively high since the inner ball, the outer housing and the rubber layer must be vulcanized together and can be put into place only after such vulcanization. It is difficult to generate a high precompression of the rubber layer in these systems and the latter have disadvantages of low stiffness in some directions, high manufacturing cost, insufficient deflection angle, etc.

OBJECTS OF THE INVENTION

It is the principal object of this invention to provide an improved ball joint whereby the aforementioned disadvantages can be avoided.

Another object of the invention is to provide a ball joint for the purpose described which is simple to assemble and to use, the ball joint having a high force constant in all directions and has a high spring constant as well.

It is also an object of the invention to provide an improved ball joint of the character described, which is maintenance-free and which permits displacement only by molecular deformation of the elstaomer layer without the disadvantages of earlier systems in which the elastomer is vulcanized both to the housing and the ball.

Still another object of the invention is to provide an improved ball joint assembly which can be manufactured at low cost and which affords relatively large deflection angles with, however, only a small restoring force.

SUMMARY OF THE INVENTION

These objects and others which will become apparent hereinafter are attained in accordance with the present invention, in a ball joint which comprises a generally spheroidal or ball-shaped inner member to which an annular elastomer layer is vulcanized or bonded, at least in an annulus around an axis of the ball, a metal shell or ring being bonded to the elastomer layer by vulcanization only over part of the surface of the ball so that portions of the elastomer surface remains exposed and can frictionally engage the wall of the housing in which the ball is received under compression.

The elastomeric layer is preferably held under compression by engagement of the housing with the partial shell vulcanized to the elastomer 2.

In other words, the ball joint of the present invention comprises an inner metallic or synthetic resin ball upon which a vulcanized rubber layer corresponding to a segment of a sphere and preferably avoiding an axis of the ball and enclosed, in turn, by a metallic housing in which the ball is received. The ball is provided with a rubber layer and projects into the outer housing with a mounting bolt extending from the housing which encloses the ball and the rubber layer.

The invention resides in providing the rubber layer or spherical segment with a vulcanized bond to the ball and to vulcanize to this layer the metal partial shell which may correspond to a segment of a spherical surface. This shell or ring being a unitary element with the ball and elastomer layer which, upon insertion of the ball and the rubber layer into the housing, is joined to the latter in force-transmitting relationship whereby the principal compression force, assuming a nonloaded ball joint, is applied between the partial shell and the housing.

In this ball joint the non-bonded portion of the elastomatic layer is pressed against a free surface of the housing during mounting with a force sufficient to prevent any frictional sliding of the rubber layer against the housing so that substantially the only movement permitted to the ball is a result of molecular deformation of the rubber layer. Under transverse loading, therefore, the elastomeric layer cannot be squeezed from its space between the ball and the housing and large displacements of the ball relative to the housing are afforded.

In part, the compression of the elastomeric material into the annular gap between the ball and the housing in relation to the fastening pin or stud is prevented by the presence of a vulcanized metal shell in this region. The annular partial shell also takes up a portion of the radial stress applied to the elastomer and tending to extrude into the aforementioned gap. Since the rubber can be made relatively thick without the danger of extrusion out of the space between the housing and the ball surface, the ball can move through relatively wide angles with only limited resistance and with only a small restoring force or moment. The radial loading of the ball joint, moreover, can be substantially higher than has been possible heretofore. Since the deflection of the ball takes place only with molecular deformation of the elastomer, the joint is completely maintained free. It will be understood that, while I prefer to use metal parts for the partial shell, housing and ball, any one of the three may be provided from a synthetic resin material and similar bonds can be formed between the rubber and the synthetic resin during vulcanization of the housing. Mounting of the ball joint requires a minimum of equipment and can be carried out without any significant expense.

According to another feature of the invention, the center of the outer rubber surface along a sphere, as previously noted, is offset from the center of the ball prior to introduction of the ball into the housing, the centers coinciding when the ball is inserted into the housing and clamped there under pressure to compress the rubber body. The radial prestress allows the swivel movement of the ball to take place about the center of the latter under a continuous radial pressure. A shifting of the center during angular displacement of the ball can be avoided and an exact guidance of the ball joint about this center may be obtained.

Also, the rubber layer during deflection of the ball about its center is uniformly subjected to shear and stress since the inner and outer parts of the ball joint are concentric and the ratio of the thickness of the elastomeric layer to the radius of the sphere remains constant.

According to another feature of the invention, the rubber is divided into spherical segments defining between an intermediate relatively wide bell-like zone around the ball and forming a space with the housing. Advantageously, the ball is provided with an annular ridge or bulge having a width approximately equal to that of the elastomer-free belt.

With this construction, the circumferential rib lying along the equator of the ball-shaped member extends into the annular gap between the two portions of the elastomeric layer and bears upon the edges of these layers with loading of the ball joint and upon compression of the elastomeric layer with insertion of the ball unit into the housing so that each layer portion is under some degree of precompression. The restoring-force moment upon annular deflection of the ball relative to the housing is reduced without affecting the radial force which must be taken up in the axial direction, i.e., parallel to the mounting bolt with which the ball may be provided.

According to another feature of the invention, the ball member is subdivided by an equatorial plane perpendicular to the axis of the mounting bolt into two generally hemispherical portions having a common center and different radii of curvature, the portions of the elastomeric layer associated with each hemisphere having a corresponding spherical radius. When the layer hemisphere is on the side of the ball provided with the bolt, it can compensate for the absence of the elastomeric material in the region in which the bolt passes out of the housing. In other words, the elastomeric layers on both hemispheres may be of equal area. The force distribution is thus uniform regardless of the direction in which the force is applied.

The annular metal shell, according to the invention, which corresponds to a surface or revolution having an axis in common with the ball, may be solid (disk-shaped) or ringshaped, as noted earlier. The solid metal shell may be applied to the elastomeric layer along that side of the ball which is opposite the side from which the bolt extends. Alternatively, this elastomer layer along the side of the ball opposite the bolt can be provided with the aforementioned ring only in the region of the elastomer layer proximal to the rib extending equatorially along the ball. It has been found that these constructions facilitate the mounting, especially when the ball unit is to be fitted into an appropriate recess provided directly in the metallic vehicle body.

In addition to the features described above, and useful in conjunction with any of them, alone or in combination, I provide a metallic partition ring in at least a segment of the elastomer layer, thereby subdividing it into two layer portions, the metal ring being vulcanized in place. Preferably, a partition ring of the type described extends over the full area of the layer or the layer segment at least at the side of the ball from which the bolt projects. This reinforces the elastomer in the region in which it would be expected to have limited effectiveness because of the passage of the bolt through the elastomer shell in this region. The partition arrangement reduces the spring constant for radial loading in the axial or bolt direction and in the opposite direction.

I have used the term "generally spheroidal" herein to describe shapes which are bodies of revolutions formed by rotating an arcuate generatrix about an axis. This shape includes a sphere in which the generatrix is a circle or part of a circle, and ellipsoidal bodies which are defined by rotating an ellipse or ellipse portion about the major or minor axis. While I prefer to make use of spherical ball and housing parts, as will become apparent below, it has been found that the ellipsoidal configuration is desirable when high radial forces must be absorbed with relatively small angular deflections of the ball and housing.

I also find it highly advantageous to extend the metal shell and/or partition of the elastomer layer cylindrically beyond the edges of the latter, at least prior to compression of the elastomer layer. The projecting cylindrical rims have been found to be important for the durability of the ball joint since the elastomeric material which bellies out upon precompression is nevertheless protected by the surface of the cylindrical rims and is not engaged by an edge to cause stress upon deflection.

It has also been found to be advantageous to provide the annular rib with a spherical-segmental face which can engage a synthetic-resin low-friction ring mounted in the housing and having a conforming spherical surface, the sliding engagement occurring upon deflection of the ball with respect to the housing. This stiffens the ball joint against lateral forces without contributing to any restoring force. This is especially important in the case of shock dampers in which bending vibrations may develop to reduce the useful life of the device. A suitable synthetic resin is polytetrafluoroethylene. Of course, the low-friction synthetic resin may be applied to the rib and can slidingly engage a spherical surface formed directly in the housing. The side of the ball turned away from the mounting bolt can be provided with a layer of the low-friction synthetic resin, preferably in the form of a shell, which may lie between the elastomer layer and the ball or between the elastomer layer and the housing. It should be noted that this latter elastomer layer functions also as a seal preventing entry of contaminants into the ball joint.

The ball may also be formed with a pair of diametrically opposite arms (extending in the radial direction) in an equatorial plane of the ball passing outwardly through openings in the housing which reaches around the ball at the locations angularly offset by about 90° from the arms around the ball axis. The arms may thus be employed to fasten the housing member by a threaded bolt, stud or nut while the arms serve to connect the inner member to the support.

The means for compressing the elastomer layer between the housing and the metal shell or ring, according to the invention, may be bolts drawing two housing portions together, may be lugs or portions of material deformed directly from the housing member to engage behind the metal shell or ring, or may be shoulders in the housing member behind which the ring can engage and which may be snap-fitted into place.

The invention also encompasses a method of making a ball joint of the character described which comprises vulcanizing an elastomeric layer, conforming to at least a generally spheroidal segment, to an inner wall member conforming to a body of revolution having a center lying along an axis at a first surface of the elastomeric layer. Around this axis I provide a round metal shell corresponding to a surface of revolution over only a portion of the elastomer layer and vulcanized thereto on a second surface across the layer. The resulting unit consists of the ball member, the elastomer layer bonded thereto by vulcanization and the metal shell bonded to the elastomer layer by vulcanization over only a portion of the exposed surface. The unit is then enclosed in a housing having an inner surface geometrically similar to the body of revolution and centered thereon while the layer is simultaneously compressed along the axis between the inner surface and the shell to retain the exposed portion of the second surface in frictional contact with the housing under a force sufficient to prevent relative sliding movement of the exposed surface of the layer and the housing. Consequently, only molecular deformation of the layer is permitted upon relative angular displacement of the ball member and the housing.

DESCRIPTION OF THE DRAWING

The above and other objects, features and advantages of the present invention will become more readily apparent from the following description, reference being made to the accompanying drawing in which:

FIGS. 7, 8, 9, 9A and 10 are axial cross-sectional views illustrating other embodiments of the invention;

FIG. 11 is an end-elevational view, partly broken away, illustrating another embodiment of the ball joint according to this invention;

FIG. 12 is a side-elevational view, partly broken away, of this last embodiment; and FIGS. 13 and 14 are similar to FIGS. 11 and 12, respectively, illustrating yet another embodiment of the invention.

SPECIFIC DESCRIPTION

Figure 1:
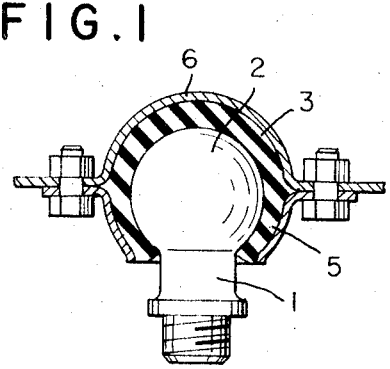
FIG. 1 is an axial cross-sectional view through a ball joint embodying the invention, showing the inner ball member in elevation and the elastomer layer under compression.
Figure 2:
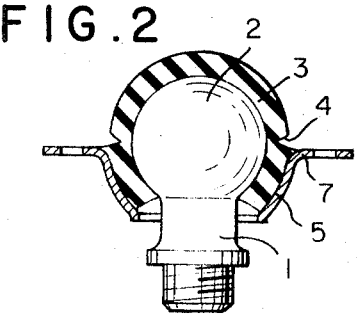
FIG. 2 is a view similar to FIG. 1, showing the ball assembly prior to compression of the elastomer layer.

In FIGS. 1 and 2 I show a ball joint having a mounting bolt 1 and carrying an inner ball 2, to the spherical surface of which is vulcanized a rubber layer 3 which is provided with a recess, split or cleft all along its equator. The portion of the elastomer layer 3 immediately surrounding the neck between the pin 1 and the ball 2 and on the side toward the facing pin 1, is formed with a metallic ball-shaped shell (partial shell) 5. When the free surface of the ball assembly is inserted into the outer generally spheroidal housing 6 (FIG. 1), which can be a recess formed directly in the chassis of an automotive vehicle, the flank 7 extending laterally outwardly and all around the shell 5, can be drawn toward the housing 6 by means of bolts thereby compressing the elastomer 3. The annular cleft 4 has the purpose of preventing extrusion of elastomer material between the metal shell 5 and the housing 6 when the latter are tightened. It will be apparent that relatively larger displacements about the center of the ball joints can be made without causing the elastomer layer to extrude into the gap between the shell 5 and the ball 2; inasmuch as the elastomer in this region is vulcanized to both. Where the elastomer layer 3 is not vulcanized to the housing but contacts it frictionally, the friction force is sufficient to prevent any movement of the elastomer surface by reason of the high compressive force applied to the elastomer. Hence, only maintenance-free molecular deformation is permitted.

Figure 3:
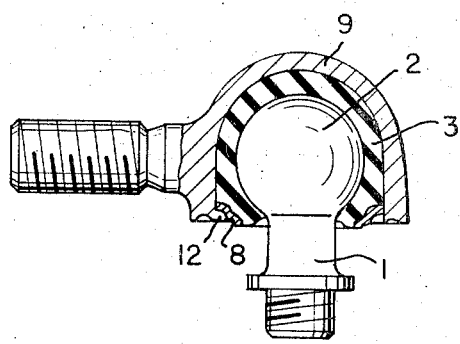
FIG. 3 is a partial cross-section illustrating an embodiment of a ball joint structure in which the elastomer layer is being in a stressed state.
Figure 4:
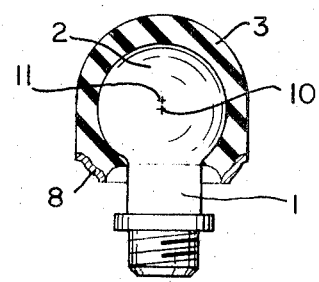
FIG. 4 is a cross-sectional view showing the ball assembly prior to stressing of the elastomer layer.

FIGS. 3 and 4 illustrate another embodiment of the invention in which the inner ball 2 is enclosed in a rubber layer 3 vulcanized to the entire spherical surface thereof. On the side of ball 2 turned toward the mounting bolt or stud 1, a partial shell of angular construction is vulcanized to the rubber layer 3. The shell 8 hereon occupies a spherical segment over a minor proportion of the entire spherical surface whereas the shell 5 in the embodiment of FIG. 1 occupies almost two quadrants of the sphere. During mounting, the ball 2, with the elastomer layer 3 vulcanized thereto, is introduced into the cup-shaped housing 9 and is pressed axially into this housing until the desired compression force is achieved. The shell 8 is then held in place by clenching an angular ridge 12 of the housing material therearound. The centerpoint of the outer surface of the elastomer layer is located at 11 (FIG. 4) prior to insertion of the ball joint into the housing. Once the compressive force has been applied and the ball locked into the housing, the center of the elastomer layer coincides with the center of the ball.

Figure 5:
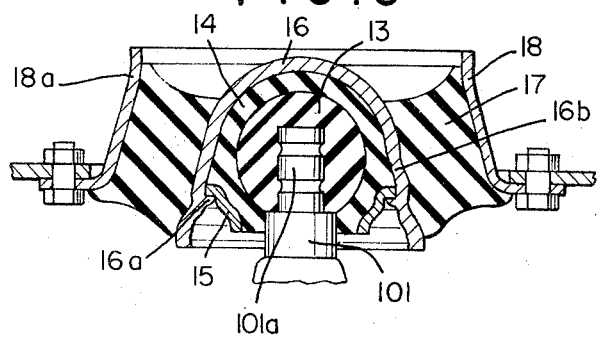
FIG. 5 is an axial cross-sectional view through a ball joint according to the invention and provided with a further spring element.
Figure 6:
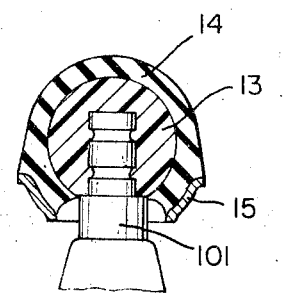
FIG. 6 is an axial cross-sectional view through the ball assembly of FIG. 5.

In FIGS. 5 and 6, I show an arrangement in which a bolt 101 is provided with a stem 101a about which the ball 13 of synthetic resin material is molded. To this bolt is vulcanized a rubber layer 14 which, in turn, is provided by vulcanization with metal ring 15. The bolt is inserted into the cup-shaped housing 16 and the ring 15 is thrust behind a shoulder 16a to maintain the elastomer layer 14 under precompression.

The housing 16, in turn, forms the inner member (having a generally frustoconical wall 16b) of a resilient cushion assembly in which a generally frustoconical rubber ring 17 is vulcanized to the wall 16b and to a frustoconical outer shell 18 at the frustoconical wall 18a. With this structure, the ball joint will have an axial "softness" which is governed by the character of the rubber mass 17 and thus may be desirably less than can be achieved by directly mounting the housing 16 upon the vehicle body. It is important, in connection with this embodiment, that the center of the ball joint coincide with the neutral position of the conical spring element. The neutral position or point is defined as the point at which a lateral force must act to generate pure shear in the conical element.

Referring now to FIG. 7, it can be seen that the ball-shaped inner member 19 is subdivided with respect to an equatorial plane P into upper and lower hemispheres 19a and 19b of equal radii of curvature having a common center C at the point which the axes A of the fastening bolt intersect. The ball member 19 is provided with vulcanized rubber layers 20 and 21, the former being a cup-shaped or generally spheroidal member lying on the side of plane P opposite that at which the bolt 201 is formed. The other layer 21 is of annular configuration.

The rubber layers 20 and 21 are separated from one another by a belt-shaped recess around an equatorial zone of the inner ball. The recess 23 thus separates the layers 20 and 21 from one another. The inner ball member 19 is formed with a circumferential rib 24 which extends into the recess 23 and, upon axial compression of the ball assembly within the housing 27, causes the flanks of the rib 24 to rest against the edges 21' etc. of the elastomer layers.

The elastomer layers 20 and 21, which for simplicity can be considered segments of a single layer, are provided with generally spheroidal shells 25 and 26 vulcanized to the rubber layers. A spring or snap ring 28 is fitted into a groove in the housing and engages behind the metal ring 26 while the hemispheric flange fitted against a shoulder in the housing 27. The layer 21 is provided with a partition ring 29 to additionally protect the layer against transverse yielding and impart high radial stiffness and strength at the side of the device from which the bolt extends. This prevents loss of strength and radial stiffness because of the lesser surface coverage of this elastomer layer. Furthermore, the elastomer layer can be made thicker and hence the displacement can be relatively high without danger of extrusion of the elastomer material. The layers 21'' and 29' are co-axially cylindrical and project axially beyond the elastomeric material prior to insertion of the ball unit within the housing so that rubber bulging outwardly after compression does not engage an edge of the ring.

In FIG. 8, there is illustrated a system in which the inner ball member is formed with two hemispheres or sections 30 and 31 with different radii of curvature as measured from a common center, the radius of curvature of the section 31 at which the bolt is provided, being the larger. The rubber layers 32 and 33, of corresponding radii, are vulcanized to the ball sections 30 and 31. The elastomer segment 32 is formed with a narrow metal ring 34 only its edge adjoining the annular recess. The other elastomer segment 33, along the side from which the ball projects, is provided with an outer metal shell 35 vulcanized thereto. When the ball unit is inserted into the outer housing 36 and the housing and metal ring 35 are drawn together by bolts 112, the free surface of the elastomer layer 32 rests in force-locking relationship together so that only molecular displacement of the elastomer layer is encountered.

The ball joint of FIG. 9 is similar to that of FIG. 7 except that the outer face 38 of the rib 39 is a spherical segment which slidingly rests against a low friction synthetic resin material, e.g., Teflin, 42 affixed to the interior of the outer housing 41 and having a corresponding spherical contour at 40. In an alternative construction shown in FIG. 9a the low friction material 142 is provided upon the rib 138 while the spherical surface 140 is machined directly in the housing 141.

The embodiment of FIG. 10 is also similar to that of FIG. 7 except that a low-friction synthetic resin shell 44 is interposed between the elastomer layer 46 and the ball member 43. Of course this shell can be provided between the elastomer layer 46 and the dished-disc cover 45. The surface of the elastomer layer 46 which is not contacted by the low-friction synthetic material can be vulcanized to the metallic part with which it is in contact.

FIGS. 11 and 12 show another system, according to the invention, in which the ball-shaped body 47 has elastomer layers 48 and 49 vulcanized thereto, the layer 48 also having vulcanized to it a metal ring 50 along the edge of this layer. The upper housing member 51 is bell-shaped and is provided with passages 52 through which a pair of diametrically opposite radial arms 53 of the ball extend. The rubber layers 48 and 49 are provided with belt-shaped clearances 54. In this case, the arms 53 also constitute ribs cooperating with the edges of the elastomer layers. The two housing portions are joined together by walls of the upper housing member 51 and inwardly toed grippers 56. The system of FIGS. 13 and 14 is generally similar although here the elastomer layers 57 and 58 which are cup-shaped are formed with partitions 59 and 60 vulcanized into the respective layers. Since the housing members 61 and 62 are provided with large openings 63, the partitions allow thick elastomer layers to be used and large deflections to be obtained without distortion of the elastomer. The housing members 61 and 62 are formed with lateral flanges which can be drawn together by bolts 66 to provide the necessary compression for the elastomer layers.

I claim:

1. A ball joint comprising:
  a. an inner ball member conforming to a body of revolution having a center lying on an axis;
  b. an elastomeric layer conforming to at least a generally spheridal segment vulcanized to said ball member along a first surface of said layer;
  c. a round metal shell having at least a periphery lying around said axis and vulcanized to only a portion of said layer on a second surface thereof opposite said first surface across said layer;
  d. a housing enclosing said ball member and having an inner surface geometrically similar to said body of revolution and centered thereon; and
  e. means interconnecting said housing and said shell for compressing said layer along said axis between said inner surface and said shell to retain the portion of said second surface free from said shell in frictional contact with said housing under a force sufficient to prevent relative sliding movement of said second and inner surfaces while permitting molecular deformation of said layer upon relative angular displacement of said ball member and said housing.

2. The ball joint defined in claim 1 wherein the center of said second surface of said layer is offset from the center of said body along said axis prior to compression of said layer, and said centers are coincident subsequent to compression.

3. The ball joint defined in claim 1 wherein said layer is subdivided into at least two generally spheroidal segments by an elastomer-free annular generally equatorial zone, said ball member being formed with an annular outwardly projecting rib having a width substantially equal to that of said zone and bearing upon said segments upon compression of said layer even without application of an external load to the ball joint for pre-compressing the elastomer layer in the principal-load direction.

4. The ball joint defined in claim 3 wherein said ball member is subdivided into two sections on opposite sides of an intermediate plane perpendicular to said principal load direction, said sections being of different radii of curvature but of an identical center of curvature, said segments of said layer having radii of curvature from said identical center corresponding to said sections.

5. The ball joint defined in claim 3 wherein said ball member has a mounting bolt extending along said axis and projecting from one side of said ball member out of said housing, said shell being vulcanized to a segment of said layer opposite said side and having a spherical contour.

6. The ball joint defined in claim 5 wherein said shell is a dish-disk lying transversely to said axis.

7. The ball joint defined in claim 5 wherein said shell is a ring vulcanized to said segment of said layer opposite said side along an edge thereof engaged by said rib.

8. The ball joint defined in claim 3 wherein one of said segments is internally partitioned by a metal ring vulcanized to the elastomer and having a spherical segment configuration.

9. The ball joint defined in claim 8 wherein said ring and shell have cylindrical coaxial axial rims surrounding said axis and extending axially beyond said layer at least prior to the compression of said layer.

10. The ball joint defined in claim 3 wherein said rib has an outer face lying along a spherical surface with a center coinciding with that of said body, said housing being formed with a low-friction synthetic resin surface slidingly engaging said face of said rib.

11. The ball joint defined in claim 3 wherein said rib has an outer face formed from a low friction synthetic resin, and said housing is formed interposed with a spherical surface concentric with said body and slidingly engaged by said face.

12. The ball joint defined in claim 3 wherein said ball member is provided with a pair of generally radial arms projecting from diametrically opposite sides of the ball member and lying substantially in the plane of said rib, said housing having two parts joined together by said means at locations flanking said ball member at diametrically opposite sides thereof but offset by about 90° around said axis from said arms, said housing having openings receiving said arms with clearance.

13. The ball joint defined in claim 2 wherein of said body of revolution is ellipsoid.

14. The ball joint defined in claim 1 wherein said ball member has the configuration of a sphere and is formed with a mounting bolt extending axially therefrom at one side of the ball member.

15. The ball joint defined in claim 14 wherein said layer is annular and is vulcanized to said side of said ball member.

16. The ball joint defined in claim 15, further comprising another elastomeric layer disposed between the other side of said ball member and said housing, and a low friction synthetic resin shell interposed between said ball member and said other elastomeric layer.

17. The ball joint defined in claim 15, further comprising a low friction synthetic resin body interposed between the other side of said ball member and said housing, said synthetic resin body having a spherical surface slidingly engaging said ball member.

18. The ball joint defined in claim 1 wherein said ball member is provided with a pair of generally radial arms projecting from diametrically opposite of the said ball member and link substantially in an equatorial plane where, said housing having two parts joined together by said means at locations flanking said ball member at diametrically opposite sides thereof but offset by about 90° about said axis from said arms, said housing having openings receiving said arms with clearance.

* * * * *